(12) United States Patent
Urie

(10) Patent No.: US 9,148,834 B2
(45) Date of Patent: Sep. 29, 2015

(54) METHOD AND APPARATUS FOR MANAGING HANDOVER OF A MOBILE STATION FROM A MACRO CELL TO A FEMTO CELL

(75) Inventor: Alistair Urie, Issy-les-Moulineaux (FR)

(73) Assignee: Alcatel Lucent, Boulogne-Billancourt (FR)

( * ) Notice: Subject to any disclaimer, the term of this patent is extended or adjusted under 35 U.S.C. 154(b) by 251 days.

(21) Appl. No.: 13/520,595

(22) PCT Filed: Dec. 16, 2010

(86) PCT No.: PCT/EP2010/007774
§ 371 (c)(1),
(2), (4) Date: Apr. 3, 2013

(87) PCT Pub. No.: WO2011/082804
PCT Pub. Date: Jul. 14, 2011

(65) Prior Publication Data
US 2013/0189997 A1  Jul. 25, 2013

(30) Foreign Application Priority Data

Jan. 8, 2010 (EP) .................................. 10290007
Jan. 14, 2010 (EP) .................................. 10290019

(51) Int. Cl.
*H04W 36/04* (2009.01)
(52) U.S. Cl.
CPC .................................. *H04W 36/04* (2013.01)
(58) Field of Classification Search
USPC .................. 455/436–444; 370/331, 356, 401
See application file for complete search history.

(56) References Cited

U.S. PATENT DOCUMENTS

| | | | |
|---|---|---|---|
| 5,640,677 A | 6/1997 | Karlsson | |
| 8,331,384 B2 * | 12/2012 | Ghai | 370/401 |
| 8,498,267 B2 * | 7/2013 | Choi-Grogan et al. | 370/331 |
| 8,538,429 B2 * | 9/2013 | Piercy et al. | 455/436 |
| 2004/0162074 A1 | 8/2004 | Chen | |
| 2009/0067417 A1 * | 3/2009 | Kalavade et al. | 370/356 |
| 2009/0156213 A1 * | 6/2009 | Spinelli et al. | 455/436 |
| 2012/0044908 A1 * | 2/2012 | Spinelli et al. | 370/331 |

FOREIGN PATENT DOCUMENTS

| | | |
|---|---|---|
| CN | 101505476 A | 8/2009 |
| WO | WO 2008/088592 A1 | 7/2008 |
| WO | WO 2009/049032 A1 | 4/2009 |

OTHER PUBLICATIONS

Japanese Office Action (with Translation) of corresponding Japanese Patent Application No. 2012-547452, Drafted Oct. 8, 2013, Dispatched Oct. 10, 2013, 4 pages.
"Technical Specification Group Core Network and Terminals; Handover Procedures," 3GPP TS 23.009 V7.0.0, Mar. 2007, pp. 1-285.
International Search Report for PCT/EP2010/007774 dated Apr. 18, 2011.

* cited by examiner

*Primary Examiner* — Diane Mizrahl
(74) *Attorney, Agent, or Firm* — Fay Sharpe LLP

(57) ABSTRACT

A method for managing handover of a mobile station from a macro cell to a femto cell comprises selecting a candidate set of target femto cells from a plurality of femto cells by applying a plurality of different filters, each filter filtering by at least one femto cell attribute. The filters may be applied successively and arranged to remove all but the most likely candidate target femto cells from further consideration.

10 Claims, 2 Drawing Sheets

METHOD AND APPARATUS FOR MANAGING HANDOVER OF A MOBILE STATION FROM A MACRO CELL TO A FEMTO CELL

FIELD OF THE INVENTION

The present invention relates to a method and apparatus of managing handover of a mobile station from a macro cell to a femto cell, and more particularly, but not exclusively, from a UMTS base station to a femto device.

BACKGROUND

In a cellular communications network, base stations are distributed over a geographical region and provide areas of coverage typically referred to as macro cells. To gain access to a network, a mobile station, which may also be referred to as a user equipment (UE), attaches to a base station supporting the macro cell in which the UE is located. If signal conditions deteriorate, for example, because the UE moves to the edge of the macro cell where signal strength is lower, it may be necessary for the UE to access the network via a different base station offering a more satisfactory connection.

In a Universal Mobile Telecommunications System (UMTS) network, the UE measures the quality of signals received from other potential target macro cells to assist in deciding when handover may be necessary. A macro cell layer Radio Network Controller (RNC), which controls the base stations, makes the handover decision based on measurements taken by the UE. The mobile station however is only able to report pilot power measurements from potential target macro cells, that is the power of a so-called "primary spreading code"; it is not able to explicitly determine the cell identification of a measured signal. The actual target cell is then determined by the RNC making use of knowledge of an orthogonal assignment of these "primary spreading codes". Following determination of the most likely handover target cell, a RELOCATION message is sent to the target cell via the RNC to initiate the handover procedures. This mechanism is in accordance with 3GPP standard TS 23.009 "Handover Procedures".

Deployment of smaller, low power transceiver femto devices, or femto base stations, that support femto cells, provides alternative routes for access to a cellular communications network. A femto base station, typically for home or business use and with a small coverage area, is usually connected via a femto gateway to the core network of the cellular communications system via a backhaul internet connection. A macro cell of the cellular communications system may have overlapping coverage with multiple femto cells. FIG. 1 schematically shows a UMTS system having two cellular network base stations 1 and 2 with their associated macro cells, illustrated by broken lines, and having within their coverage areas a plurality of femto devices 3 to 9 with associated femto cells. The base stations 1 and 2 are connected to an RNC 10 which is connected to a Mobile Switching Center (MSC) 11. The MSC 11 is also connected via a femto gateway 12 to femto devices 3 to 9 (not all of these connections are explicitly shown in FIG. 1.)

When a UE, for example, UE 13 in FIG. 1 attached to a macro cell base station 2, takes measurements to seek a handover target, it may detect the femto cell 4 as a potential target. However, measurements taken by the UE are often insufficient to determine the identity of the most appropriate target femto cell for handover. There are only a limited number of primary spreading codes (only 512 codes are defined by 3GPP in the release 8 version of the standard) and it is probable that only ten to twenty of these codes would be available for all of the femto cells located within a particular macro cell, with the remaining codes used to identify neighboring macro and micro cells. Since it is likely that more than ten to twenty femto devices will be installed in each macro cell, it is unlikely that a unique identification can be made using the primary spreading codes. A mechanism is therefore required to determine which is the most likely target femto cell in order to be able to forward to it an incoming RELOCATION message from the macro cell RNC 10.

One potential solution involves multicasting an incoming RELOCATION message to all femto cells located within the macro cell coverage zone. However, this results in transmission of signaling messages to femto cells that are not suitable handover targets and is thus increases traffic without benefit. It may also unnecessarily overload the femto devices since each one in the macro cell would need to prepare itself for an incoming mobile station.

BRIEF SUMMARY

According to a first aspect of the invention, a method for managing handover of a mobile station from a macro cell to a femto cell comprises selecting a candidate set of target femto cells from a plurality of femto cells by applying a plurality of different filters, each filter filtering by at least one femto cell attribute. This enables the pool of candidate femto cells to be narrowed down so as to only include only that or those most likely to be a target femto cell. The filtering does not necessarily result in a single femto cell being identified as the target, but it eliminates those femto cells that are not appropriate and thus enables resources to be more effectively managed.

In one embodiment, the filters are applied successively in turn to produce a series of filtered sets. In another embodiment, two or more filters may be applied in parallel to a set of femto cells and then a comparison made to determine which femto cells satisfy all the applied filter conditions.

In one embodiment, the filters are applied at least in part at a femto gateway. For example, a plurality of databases or some other form of data store may be included at the femto gateway, with each database holding information about a femto cells to which a filter, or filters, is applied.

In one embodiment, the attributes include at least some of: femto cell location; assigned carrier; assigned spreading code; IMSI identifier; TMSI identifier; and if the femto cell has been previously handled by a respective femto cell. Other suitable attributes may also be used. Attributes that are suitable for network operating in accordance with one communication standard might not be appropriate for a network in accordance with a different standard, for example.

According to a second aspect of the invention, a femto gateway has access to a plurality of filters for selecting a candidate set of target femto cells from a plurality of femto cells, each filter filtering by at least one femto cell attribute.

According to a third aspect of the invention, a communications arrangement includes a femto gateway in accordance with the invention.

BRIEF DESCRIPTION OF THE DRAWINGS

Some embodiments of the present invention will now be described by way of example only, and with reference to the accompanying drawings, in which.

DETAILED DESCRIPTION

Figure 1:
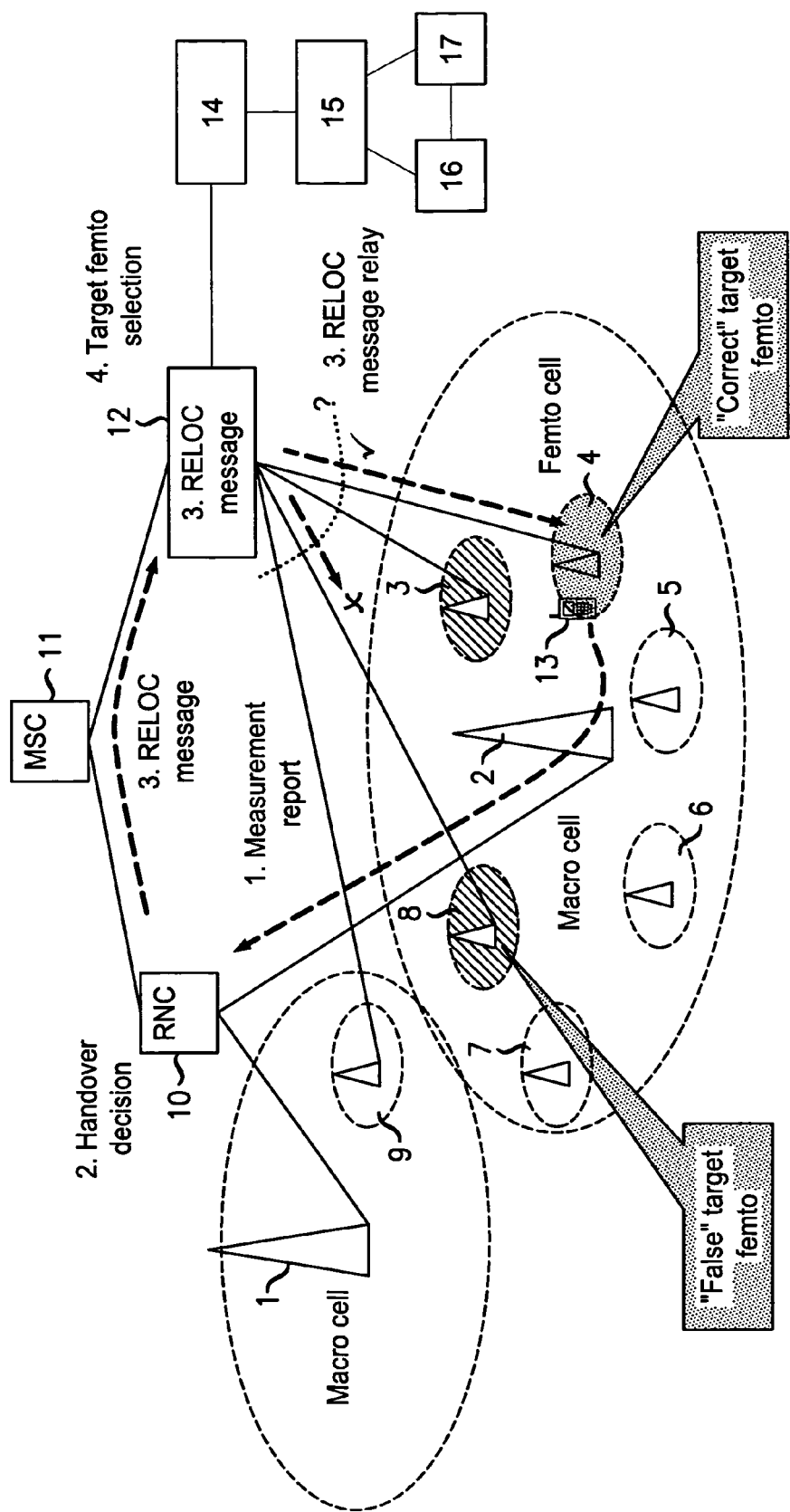
FIG. 1 schematically illustrates a cellular communications network.

In a system as shown in FIG. 1, UE 13 is attached to the macro cell associated with base station 2. The UE 13 provides measurement information to the base station 2, the measurement information including, for example, the target cell-id and its scrambling code. The base station 2 sends the information to the RNC 10 which makes a handover decision based on the measurements.

When handover is deemed advisable, the RNC 10 initiates handover procedure by forwarding a RELOCATION message to the femto gateway 12 via MSC 11 in accordance with 3GPP standard TS 23.009. The RELOCATION message contains the IMSI (International Mobile Subscriber Identifier) and/or TMSI (Temporary Mobile Subscriber Identifier) of UE 13 and information to assist the target RNC, which in this case is the femto gateway 12, to determine the target cell.

Within the femto gateway 12, the information included in the RELOCATION message is successively filtered according to a set of databases to determine those femto cells that are most likely to be target candidates.

The femto gateway 12 includes a first database 14, or other form of data store, that includes a list of all femto cells in a region. In a first stage, the first database 14 is filtered so as to remove all femto cells that are not located within the macro cell supported by the base station 2 to provide a first filtered set of femto cells. The information received at the femto gateway 12 includes the current source base station identity, and thus its geographical coverage is known. With this first filtering stage, all femto cells located under other macro cells are removed from further consideration. Thus, for example, femto cell 9 is excluded as it does not overlap with the coverage afforded by base station 2. In another embodiment of the invention, the location of the femto cells with respect to a given macro cell is arranged to also include femto cells outside but near to the boundaries of that macro cell, so that, femto device 9 would in that case be retained in the filtered set.

In a second stage, the first filtered set of femto cells populates a second database 15 or data store. Then the first filtered set is further filtered to produce a second filtered set by retaining only those femto cells that are assigned the same carrier and spreading codes that are included with the RELOCATION message. This filtering stage may remove approximately 90% to 95% of femto cells form the first filtered set in an arrangement where ten to twenty codes are assigned to femto cells in a macro cell. The second filtering stage may be carried out as a two step process, for example, by initially filtering using carrier information and the results of that initial filtering then being further filtered by using spreading code, or vice versa.

In one embodiment of the invention, the filtering process is concluded after the second filtering stage. The femto cells remaining in the second filtered set are then each sent a copy of the RELOCATION message using polling and/or multicast to determine the target femto cell, as set out below.

In another embodiment, a third filtering stage is also included to be applied after the second filtered set has been produced. The second filtered set is further filtered so as to only retain those femto cells that have previously handled the same IMSI/TMSI, listed on a "previously handled IMSI/TMSI" database 16, and/or previously had same IMSI/TMSI registered on the femto cell's "White List" or access control list, stored in database 17. This stage in one embodiment requires that the femto device must be included in both database 16 and database 17, and in another embodiment that it is sufficient if the femto device is included in only one of database 16 and database 17. This third filtering stage may thus remove all femto cells that have not previously offered service to the particular mobile station UE 13. The "previously handled IMSI/TMSI" database 16 may be populated via monitoring of recent signaling traffic from each femto device, for example, using idle mode Cell Reselection messages.

The remaining potential target femto cells following the third filtering stage then each receive a copy of the RELOCATION message using polling and/or multicast. The final target femto device may then be determined following simple polling or multicast of the RELOCATION message with the femto gateway 12 waiting for a "UE DETECTION" message from the correct femto device, thus signaling that the UE13 has been identified and hence the handover, or more formally the Relocation process, may can continue in accordance with 3GPP standards.

Figure 2:
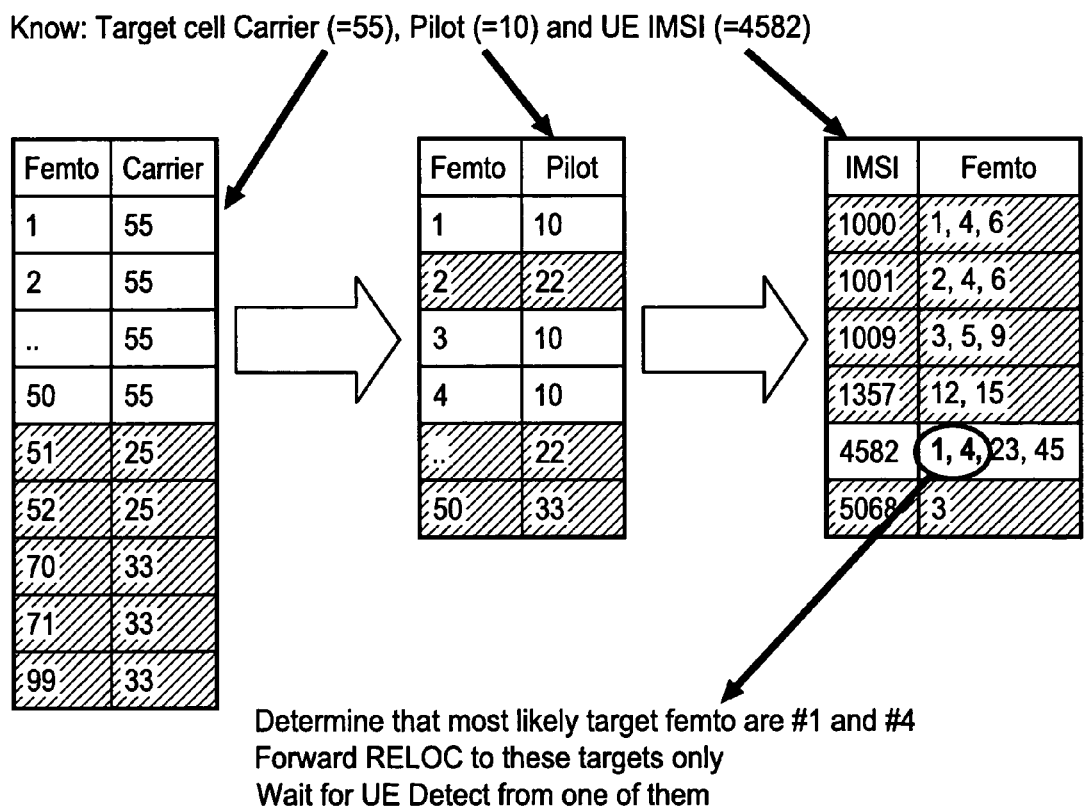
FIG. 2 schematically illustrates steps in a method in accordance with the invention.

FIG. 2 illustrates a method in accordance with the invention, in which three filtering stages are applied successively using target cell carrier, pilot and identity information to successively reduce the number of femto cells to be considered as potential handover targets.

In another embodiment of the invention, the filtering steps are carried out in a different sequence to those included in the embodiments described above, may be omitted or may include additional filtering steps and parameters or attributes. In another embodiment, some or all of the filtering steps are applied in parallel to a set of femto cells and then a comparison made to determined which device or devices meet the filter requirements. Parameters other than those described above may be used to filter the femto cells.

In the above described embodiment, the databases are included in the femto gateway 12. In other arrangements, they may be held in a separate unit, or units, which may be locate remotely from the femto gateway.

The invention may be applied to cellular communications arrangements operating in accordance with standards other than UMTS or 3GPP defined standards and where femto devices are deployed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for managing handover of a mobile station from a macro cell to a femto cell comprising selecting a candidate set of target femto cells from a plurality of femto cells by applying a plurality of different filters, each filter filtering by at least one femto cell attribute, wherein, when filtering is concluded, a relocation message is sent to the remaining potential target femto cells and a final target femto device is then determined using polling or multicast.

2. The method as claimed in claim 1 and wherein the filters are applied successively in turn to produce a series of filtered sets.

3. The method as claimed in claim 1 and wherein the filters are applied at least in part at a femto gateway.

4. The method as claimed in claim 1 and wherein the attributes include at least some of: femto cell location; assigned carrier; assigned spreading code; Internal Mobile Subscriber Identifier; Temporary Mobile Subscriber Identifier; and an indication as to whether the femto cell has been previously handled by a respective femto cell.

5. The method as claimed in claim 1 and including receiving a message requesting handover and using information sent with the message to characterize a target femto cell.

6. The method as claimed in claim 1 and including waiting for a mobile station detection message from a target femto cell following forwarding of the relocation message.

7. The method as claimed in claim 1 and wherein the macro cell is included in a Universal Mobile Telecommunications System communications network.

8. A femto gateway having access to a plurality of filters configured to select a candidate set of target femto cells from a plurality of femto cells, each filter filtering by at least one femto cell attribute,
    wherein, when filtering is concluded, a relocation message is sent to the remaining potential target femto cells and a final target femto device is then determined using polling or multicast, and
    wherein the femto gateway receives a User Equipment (UE) Detection message from the final target femto device, signaling that handover may continue.

9. The femto gateway as claimed in claim 8 and wherein at least one of the plurality of filters is located at the gateway.

10. The femto gateway as claimed in claim 8 and including a plurality of data stores configured to store respective filtered sets of femto cells.

\* \* \* \* \*